US011307595B2

(12) United States Patent
Lim

(10) Patent No.: US 11,307,595 B2
(45) Date of Patent: Apr. 19, 2022

(54) APPARATUS FOR ACQUISITION OF DISTANCE FOR ALL DIRECTIONS OF MOVING BODY AND METHOD THEREOF

(71) Applicant: MultiplEYE Co., Ltd., Seoul (KR)

(72) Inventor: Jongwoo Lim, Seoul (KR)

(73) Assignee: MULTIPLEYE CO., LTD., Seoul (KR)

( * ) Notice: Subject to any disclaimer, the term of this patent is extended or adjusted under 35 U.S.C. 154(b) by 247 days.

(21) Appl. No.: 16/741,701

(22) Filed: Jan. 13, 2020

(65) Prior Publication Data
US 2021/0124367 A1  Apr. 29, 2021

(30) Foreign Application Priority Data
Oct. 25, 2019  (KR) .................. 10-2019-0134052

(51) Int. Cl.
G05D 1/02 (2020.01)
B60W 10/30 (2006.01)
G01S 11/04 (2006.01)

(52) U.S. Cl.
CPC ........... *G05D 1/0251* (2013.01); *B60W 10/30* (2013.01); *G01S 11/04* (2013.01)

(58) Field of Classification Search
CPC ...... G05D 1/0251; B60W 10/30; G01S 11/00; G01S 11/04; G06T 2207/20041; G06T 7/593; G05B 2219/37425
See application file for complete search history.

(56) References Cited

U.S. PATENT DOCUMENTS

| 9,998,659 B2 | 6/2018 | Bassi | |
| 10,194,114 B1 | 1/2019 | Su | |
| 10,366,512 B2 | 7/2019 | Jeong et al. | |
| 2018/0278916 A1 | 9/2018 | Kim et al. | |
| 2018/0293454 A1* | 10/2018 | Xu | ............ G06T 7/248 |
| 2018/0322611 A1* | 11/2018 | Bang | ............ G06T 3/0087 |
| 2019/0138029 A1* | 5/2019 | Ryll | ............ G05D 1/101 |
| 2019/0217889 A1 | 7/2019 | Szabo et al. | |
| 2019/0295282 A1 | 9/2019 | Smolyanskiy et al. | |
| 2020/0273192 A1* | 8/2020 | Cheng | ............ G06K 9/6232 |

(Continued)

FOREIGN PATENT DOCUMENTS

| JP | 5366264 B2 | 12/2013 |
| JP | 2016114445 A | 6/2016 |
| KR | 10-2017-0017700 A | 2/2017 |

(Continued)

OTHER PUBLICATIONS

Korean Decision to Grant dated Aug. 23, 2021, in corresponding Korean Patent Application No. 10-2019-0134052, 4 pp.

(Continued)

*Primary Examiner* — Aaron L Troost
(74) *Attorney, Agent, or Firm* — Xsensus LLP

(57) ABSTRACT

A vision apparatus for a moving body is provided. The vision apparatus for a moving body includes a plurality of cameras that are arranged to be distanced from one another, and are arranged in a diagonal direction to the moving direction of the moving body, and a processor that receives images photographed at each of the plurality of cameras, and stereo-matches the plurality of received images and generates distance information for all directions of the moving body.

18 Claims, 11 Drawing Sheets

(56) References Cited

U.S. PATENT DOCUMENTS

2021/0065393 A1* 3/2021 Jeon ................. G06K 9/6271

FOREIGN PATENT DOCUMENTS

| KR | 20170017700 | A  | 2/2017 |
|----|-------------|----|--------|
| KR | 101949358   | B1 | 2/2019 |
| KR | 20190032488 | A  | 3/2019 |
| KR | 101939349   | B1 | 4/2019 |

OTHER PUBLICATIONS

Korean Office Action dated Dec. 24, 2020, in corresponding Korean Patent Application No. 10-2019-0134052, 13 pp.

Im, Sunghoon et al., "All-around Depth from Small Motion with a Spherical Panoramic Camera", Korean Advances Institute of Science and Technology (KAIST), Republic of Korea. Oct. 2016. 17 pages.

Seok, Hochang et al., "Robust Omnidirectional Visual Odometry for Wide-baseline Wide-FOV Camera Systems" *Department of Computer Science, Hanyang University*, Seoul, Korea. May 20, 2019. 7 pages.

Won, Changhee et al., "SweepNet: Wide-baseline Omnidirectional Depth Estimation" *Department of Computer Science, Hanyang University*, Seoul, Korea. May 20, 2019. 7 pages.

Korean Office Action dated Dec. 24, 2020, in corresponding Korean Patent Application No. 10-2019-0134052.

Lionel Heng, "Project AutoVision: Localization and 3D Scene Perception for an Autonomous Vehicle with a Multi-Camera System", arXiv: 1809.05477 v1 . (Sep. 14, 2018), 9 pp.

Ren Komatsu, "Octave Deep Plane-Sweeping Network: Reducing Spatial Redundancy for Learning-Based Plane-Sweeping Stereo", IEEE Access, (Oct. 14, 2019), 12 pp.

Sebastien Roy, "Cylindrical Rectification to Minimize Epipolar Distortion", CVPR. (Jun. 17, 1997), 7 pp.

\* cited by examiner

FRONT SURFACE

Algorithm 1: multi-view P3P RANSAC algorithm

Data: 2D feature locations and 3D landmark correspondences in all views, $\{\{(\bar{x}_{i_j}, {}^w X_{i_j})\}_{i_j}\}_j$

Result: Rigid body transformation ${}^b_w\theta^*$

1. while $iter < iter_{max}$ do
2.     Select a camera $j'$ using PPS sampling.
3.     Randomly sample 3 pairs in the selected camera.
4.     Get camera pose candidates $\{{}^{j'}_w\theta_k\}$ by P3P.
5.     Compute the body pose candidates $\{{}^b_w\theta_k\}$.
6.     for each body pose candidate ${}^b_w\theta_k$ do
7.         for each camera $j$ do
8.             Compute the camera pose ${}^j_w\theta_k$.
9.             Add reprojection error of all inliers in $j$:
10.             $C_k \mathrel{+}= \sum_{i_j} \max(0, \tau_r - \|\bar{x}_{i_j} - \pi_0({}^j_w\theta_k \star {}^w X_{i_j})\|)$
11.         end
12.         if $C_k$ is largest then
13.             ${}^b_w\theta^* \leftarrow {}^b_w\theta_k$.
14.             Update $iter_{max}$ with the new inlier ratio.
15.         end
16.     end
17. end

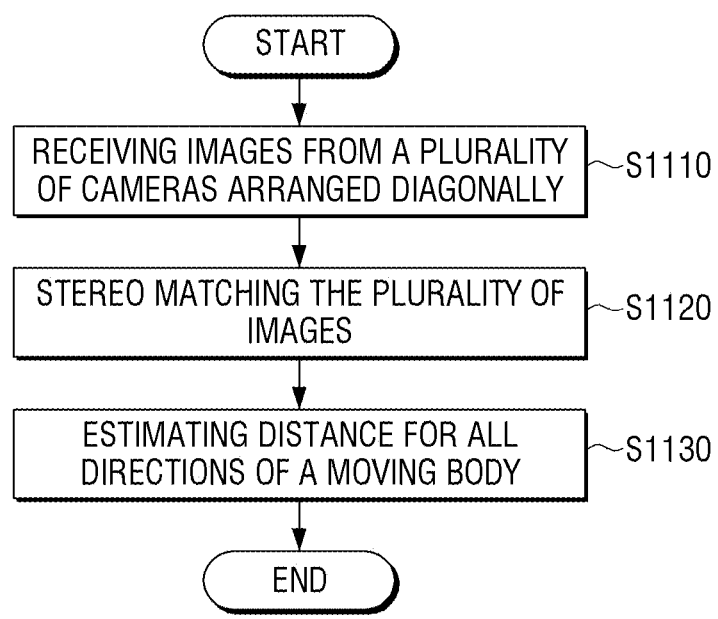

APPARATUS FOR ACQUISITION OF DISTANCE FOR ALL DIRECTIONS OF MOVING BODY AND METHOD THEREOF

CROSS-REFERENCE TO RELATED APPLICATION(S)

This application is based on and claims priority under 35 U.S.C. § 119(a) of a Korean patent application number 10-2019-0134052, filed on Oct. 25, 2019, in the Korean Intellectual Property Office, the disclosure of which is incorporated by reference herein in its entirety.

BACKGROUND

1. Field

The disclosure relates to an apparatus for acquisition of distance for all directions of a moving body and a method thereof, and more particularly, to an apparatus for acquisition of distance which can acquire distance information for all directions of a moving body by using images photographed at four photographing apparatuses located on a corner surface of the moving body and a method thereof.

2. Description of Related Art

As autonomous driving, etc. are gaining attention recently, various technologies which enable identification of environment information around a vehicle are being used. Among such information, the most important information is identification of the distance to an object located nearby.

For this, in the conventional technology, LiDAR and RADAR sensors were used, or general stereo cameras were used. However, in a method of using LiDAR and RADAR sensors, the price, the amount of power consumption, etc. are very high compared to a general camera, and as distance is measured by shooting laser, there may be interference between sensors. Also, as a machine operates while rotating, there are problems that a machine is mechanically unstable, and the measured resolution is lower compared to a camera.

Meanwhile, in a method of using general stereo cameras, too many cameras (e.g., 12 cameras) are needed for estimating distance in all directions of a vehicle, and when estimating distance from each pair, it is difficult to propagate information on an adjacent area among pairs, and there was also a problem of discontinuity on a border surface.

SUMMARY

Accordingly, the disclosure was devised for overcoming the aforementioned problem, and is aimed at proving an apparatus for acquisition of distance which can acquire distance information for all directions of a moving body by using images photographed at four photographing apparatuses located on a corner surface of the moving body and a method thereof.

Thus, the disclosure was devised for overcoming the aforementioned problem, and a vision apparatus for a moving body according to an embodiment of the disclosure includes a plurality of cameras that are arranged to be distanced from one another, and are arranged in a diagonal direction to the moving direction of the moving body, and a processor that receives images photographed at each of the plurality of cameras, and stereo-matches the plurality of received images and generates distance information for all directions of the moving body.

In this case, the plurality of cameras may be four cameras having a field of view of greater than or equal to 200 degrees.

In this case, the moving body may be a vehicle, and the four cameras may be arranged in a diagonal direction to the moving direction of the moving body in each corner area of the roof of the vehicle.

Meanwhile, the processor may project each of the plurality of received images on a virtual three-dimensional figure, and perform stereo-matching by using the projected images.

In this case, the vision apparatus may further include a memory storing posture information for each of the plurality of cameras, and the processor may project each of the plurality of images on the virtual three-dimensional figure by using the stored posture information.

In this case, the processor may calculate the posture information of each of the plurality of cameras in a unit of a predetermined cycle, and update the stored posture information.

Meanwhile, the virtual three-dimensional figure may be one of a spherical shape, a cube, a cuboid, or a cylinder.

Meanwhile, the processor may generate feature maps for each of the plurality of received images, and project each of the plurality of generated feature maps on the virtual three-dimensional figure.

In this case, the processor may merge the plurality of feature maps projected on the three-dimensional figure and generate a space map for all directions of the moving body, and generate a depth map for all directions of the moving body by using the generated space map.

Meanwhile, the processor may calculate a six-degree of freedom posture of the moving body based on the distance information.

Meanwhile, the processor may project areas wherein fields of view overlap among the plurality of cameras on a plane model, and project areas wherein fields of view do not overlap on a cylinder model, and perform image processing for the received images.

Meanwhile, a method of generating distance information according to an embodiment of the disclosure may include the steps of receiving images from each of a plurality of cameras that are arranged to be distanced from one another, and are arranged in a diagonal direction to the moving direction of the moving body, and stereo-matching the plurality of received images and generating distance information for all directions of the moving body.

In this case, the step of generating distance information may include the steps of projecting each of the plurality of received images on a virtual three-dimensional figure, and performing stereo-matching by using the projected images.

In this case, in the step of projecting, each of the plurality of images may be reflected to the virtual three-dimensional figure by using the pre-stored posture information for each of the plurality of cameras.

Meanwhile, the step of generating distance information may further include the step of generating feature maps for each of the plurality of received images, and in the step of projecting, each of the plurality of generated feature maps may be reflected to the virtual three-dimensional figure.

In this case, the step of performing stereo matching may include the steps of merging the plurality of feature maps projected on the virtual three-dimensional figure and generating a space map for all directions of the moving body, and generating a depth map for all directions of the moving body by using the generated space map.

Meanwhile, the method of generating distance information may further include the step of calculating a six-degree of freedom posture of the moving body based on the distance information.

Meanwhile, the method of generating distance information may further include the step of projecting areas wherein fields of view overlap among the plurality of cameras on a plane model, and projecting areas wherein fields of view do not overlap on a cylinder model, and performing image processing for the received images.

The disclosure is for achieving the aforementioned purpose, and a vision apparatus and a method thereof according to the disclosure enable generation of distance information for all directions of a moving body by using only four cameras. Also, as the vision apparatus and the method thereof correct distortion of a multi wide angle image by using a geometric relation among cameras and a lens distortion parameter at the same time, corresponding image pairs among cameras can be effectively estimated. In addition, as the vision apparatus and the method thereof can compensate an error with respect to a photographing direction of a camera in real time, degradation of performance can be prevented.

BRIEF DESCRIPTION OF THE DRAWINGS

FIG. 10 is a diagram for illustrating a posture estimation algorithm according to an embodiment of the disclosure; and FIG. 11 is a flow chart for illustrating a method of generating distance information according to an embodiment of the disclosure.

DETAILED DESCRIPTION

Hereinafter, the disclosure will be described in detail with reference to the accompanying drawings. Meanwhile, transmission or transfer mentioned in this specification may mean transmission of data or information or a signal, etc., and depending on needs, encryption/decryption may be applied.

Also, in this specification, expressions such as "transmit (transfer) from A to B" and "A receives from B" include a case wherein an object is transmitted (transferred) or received while another medium is included in between, and do not necessarily express that an object is directly transmitted (transferred) or received from A to B. Also, each apparatus illustrated and mentioned in this specification may be implemented as apparatuses independent from one another, but the disclosure is not necessarily limited thereto, and the apparatuses may be implemented as several components included in one apparatus.

In the description of the disclosure, the order of each step should be understood in a nonrestrictive way, unless a preceding step should necessarily be performed prior to a subsequent step in a logical and temporal sense. That is, excluding an exceptional case as above, even if a process described as a subsequent step is performed prior to a process described as a preceding step, there would be no influence on the essence of the disclosure, and the scope of the disclosure should also be defined regardless of the orders of steps.

Also, in this specification, the description "A or B" is defined as meaning a case wherein both A and B are included, as well as a case wherein any one of A or B is selectively indicated. In addition, in this specification, the term "include" has a meaning including a case wherein other components are further included in addition to elements listed as being included.

Further, in this specification, only essential components necessary for description of the disclosure are explained, and components that are not related to the essence of the disclosure are not mentioned. Also, the description of the disclosure should not be interpreted as exclusive meaning including only the components mentioned, but should be interpreted as non-exclusive meaning that other components may be included.

The mathematical operations and calculation in each step of the disclosure that will be described below can be implemented as computer operations by a coding method known for performing such operations or calculation and/or coding appropriately designed for the disclosure.

Hereinafter, various embodiments of the disclosure will be described in detail by using the accompanying drawings.

Figure 1:
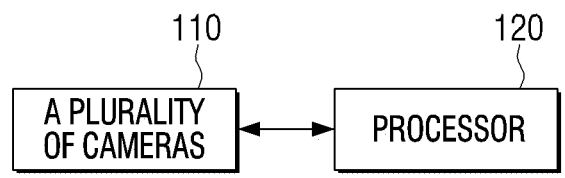
FIG. 1 is a block diagram illustrating a schematic configuration of a vision apparatus according to an embodiment of the disclosure.

FIG. 1 is a block diagram illustrating a schematic configuration of a vision apparatus according to an embodiment of the disclosure.

Referring to FIG. 1, the vision apparatus 100 may include a plurality of cameras 110 and a processor 120. Here, the vision apparatus 100 is an apparatus based on vision that detects the surrounding environment of a moving body, and may generate a depth map having distance information for all directions of a moving body. In addition, the vision apparatus 100 may be a driving assistant system combined with a driving system of a moving body, an around view apparatus, an autonomous driving system, etc.

Here, the moving body may be an automobile like a car, or a moving object like a drone, etc.

The plurality of cameras 110 may be arranged in a diagonal direction to the moving direction of a moving body. Such cameras may be constituted in the number of four, and each camera may be a fish-eye lens camera of which viewing angle is greater than or equal to 200 degrees. Here, a diagonal direction may be a diagonal direction of approximately 45 degrees (or −45 degrees, 225 degrees, −225 degrees) to the left with respect to the moving direction (e.g., the front surface). However, the aforementioned numerical values are merely examples, and various values may be used according to the number of cameras and the field of view of each camera.

As described above, each camera has a wide viewing angle, and thus it is possible to generate images for all directions (the front side, the both sides, the rear surface) of a moving body by using four cameras. Also, with respect to each direction, two cameras photograph the same area in an overlapping way, and thus it is possible to estimate distance. The detailed arrangement structure of the plurality of cameras and an effect resulting therefrom will be described below with reference to FIGS. 3 and 4.

The processor 120 controls each component in the vision apparatus 100. For example, the processor 120 may control the overall operations of the vision apparatus 100 by executing at least one instruction stored in the memory 140 that will be described below. Such a processor 120 may consist of one CPU, or may be implemented as a combination of various apparatuses such as a CPU, a GPU, an ASIC, etc.

The processor 120 may receive images photographed at each of the plurality of cameras 110. For example, images output at the plurality of cameras 110 may be directly transmitted to the processor 120, or transmitted through a separate apparatus (e.g., a repeater, etc.). Meanwhile, in actual implementation, each image may be transmitted to the processor 120 by a wireless communication method as well as a wired communication method.

Also, the processor 120 may perform image processing for the received images. For example, the cameras used in the disclosure are fish-eye lens cameras, and fish-eye lens cameras have a distortion characteristic different from general cameras. For this reason, in order to perform estimation of corresponding pairs that will be described below faster, the processor 120 may first perform image processing that compensates unique distortion of a fish-eye lens for the received images.

For example, the processor 120 may project areas wherein fields of view overlap among the plurality of cameras on a plane model, and project areas wherein fields of view do not overlap on a cylinder model, and perform image processing for the received images.

Here, the processor 120 may combine an image projected on a cylinder model and an image projected on a plane model by using a hybrid projection model which smoothly connects the plane model and the cylinder model.

Also, the processor 120 may stereo-match the plurality of received images and generate distance information for all directions of the moving body.

Here, the processor 120 may generate feature maps in the plurality of images (or images for which image processing was performed) that were input in advance. For example, the processor 120 may input an image into a synthesized neural network, and extract a plurality of feature maps. In the case of using feature maps, there is an effect that the amount of operations in a stereo mapping process can be reduced.

Then, the processor 120 may project the plurality of images (or the plurality of feature maps) on a virtual three-dimensional figure. For example, the processor 120 may project each of the plurality of images on a virtual three-dimensional figure by using posture information for each of the plurality of cameras 110.

Here, posture information is information on the photographing directions of the cameras. A detailed method of generating such posture information will be described below with reference to FIG. 5. Also, a three-dimensional figure may be one of a spherical shape, a cube, a cuboid, or a cylinder. An example of an operation of projecting an image on a spherical shape will be described below with reference to FIG. 6.

Then, the processor 120 may merge each of the plurality of images projected on the three-dimensional figure and generate a space map for all directions of the moving body.

For example, the processor 120 may merge each of the feature maps projected on the three-dimensional figure and convert them to include information on physical spaces with respect to three-dimensional areas in all directions. Alternatively, the processor 120 may calculate a cost map for the plurality of images by using a spherical sweep algorithm.

Also, the processor 120 may generate a depth map for all directions of the moving body by using the generated space map (or cost map). For example, the processor 120 may generate a depth map for all directions of the moving body by using 3 dimensional coordinates used in 3D convolution and the space map.

Then, the processor 120 may calculate the posture of the moving body. A detailed operation of calculating the posture will be described below with reference to FIG. 10.

Also, the processor 120 may give necessary notification to a user, or perform an operation of changing the driving path, etc. by using the generated depth map.

Meanwhile, so far, only simple components constituting a vision apparatus were illustrated and explained, but in actual implementation, various components may be additionally provided. Explanation in this regard will be made below with reference to FIG. 2.

Figure 2:
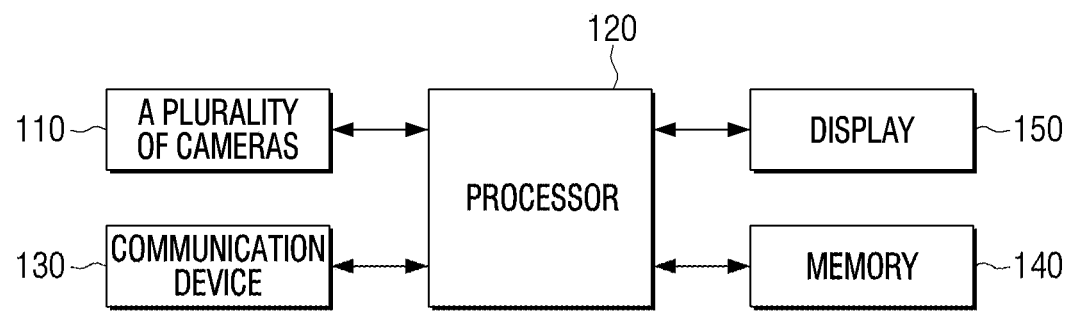
FIG. 2 is a block diagram illustrating a detailed configuration of a vision apparatus according to an embodiment of the disclosure.

FIG. 2 is a block diagram illustrating a detailed configuration of a vision apparatus according to an embodiment of the disclosure.

Referring to FIG. 2, the vision apparatus 100 may include a plurality of cameras 110, a processor 120, a communication device 130, a memory 140, and a display 150.

As the plurality of cameras 110 were explained with respect to FIG. 1, overlapping explanation will be omitted. Also, as the processor 120 was also explained with respect to FIG. 1, the content explained with respect to FIG. 1 will not be repetitively described, but only the content related to the components added in FIG. 2 will be explained below.

The communication device 130 may connect each component in the vision apparatus 100. For example, the communication device 130 may be connected to each of the plurality of cameras by a wired or wireless method, and may receive images (or videos) from each camera, and provide the received images to the processor 120.

Also, the communication device 130 is formed to be connected to an external device, and it may not only be in the form of being connected to the vision apparatus 100 through a local area network (LAN) and the Internet network, but may also be in the form of being connected to the vision apparatus 100 through a universal serial bus (USB) port, and a wireless communication network.

For example, the communication device 130 may be connected to a GPS satellite, a base station, a map server, etc., and may receive a GPS signal transmitted by a GPS satellite, and provide the signal to the processor 120.

Also, the communication device 130 may provide the generated distance information (specifically, a depth map) to an external device (e.g., a moving body).

In the memory 140, at least one instruction regarding the vision apparatus 100 may be stored. For example, in the memory 140, various kinds of programs (or software) for operating the vision apparatus 100 according to the various embodiments of the disclosure may be stored.

Also, the memory 140 may store images photographed at the plurality of cameras, and may store images for which image processing was performed. In addition, the memory 140 may store distance information for all directions of the moving body, i.e., the depth map generated at the processor 120.

Further, the memory 140 may store posture information for each of the plurality of cameras. Also, the memory 140 may store the calculated posture information of the moving body.

The display 150 may display various kinds of information provided at the vision apparatus 100. Such a display 150 may be a monitor such as a liquid crystal display (LCD), a cathode ray tube (CRT), organic light emitting diodes (OLEDs), etc.

Such a display 150 may display distance information for all directions of a moving body, or display an image (an around view) for all directions of a moving body. Also, in case distance with a specific object near a moving body becomes drastically close and notification is needed, the display 150 may perform an operation of displaying notification, etc.

When the processor 120 performs stereo mapping by using posture information stored in the memory 140, the processor 120 may project images on a spherical surface by using the stored posture information. Also, the processor 120 may calculate posture information of each camera periodically, and update the pre-stored posture information based on the calculated posture information.

In addition, the processor 120 may store the generated information such as distance information (i.e., a depth map) in the memory 140.

As described above, a vision apparatus according to an embodiment of the disclosure can generate distance information for all directions of a moving body by using only four cameras. Also, as the vision apparatus corrects distortion of a multi wide angle image by using a geometric relation among cameras and a lens distortion parameter at the same time, corresponding image pairs among cameras can be effectively estimated. In addition, as the vision apparatus can compensate an error with respect to a photographing direction of a camera in real time, degradation of performance can be prevented.

Meanwhile, in illustrating and explaining FIG. 1 and FIG. 2, it was illustrated and explained that the vision apparatus 100 is an apparatus distinguished from a moving body, but in actual implementation, the vision apparatus 100 may be one component of a moving body, or some components in an autonomous driving system.

Figure 3:
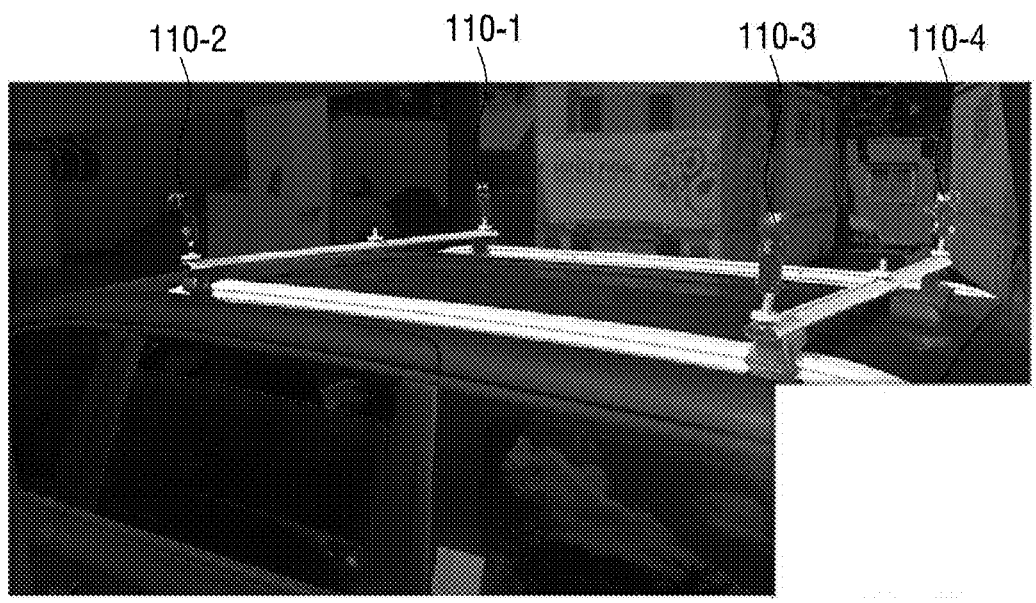
FIG. 3 is a diagram illustrating an example of a case wherein a plurality of cameras according to the disclosure are arranged in a vehicle.
Figure 4:
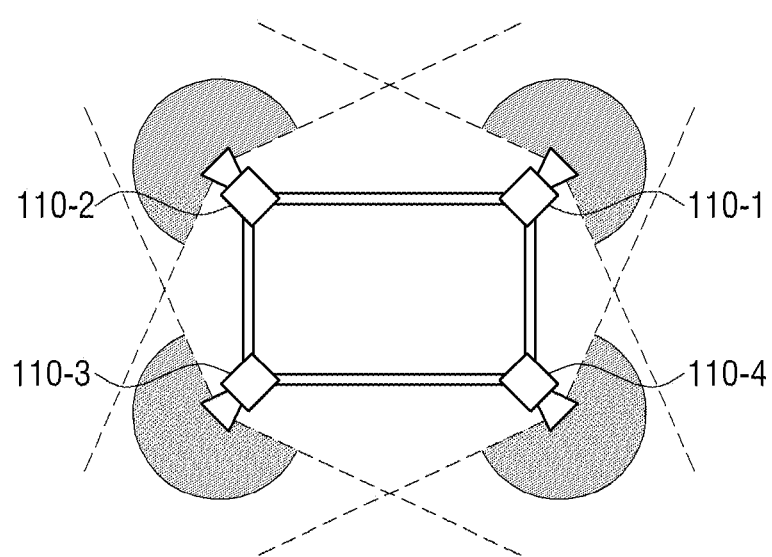
FIG. 4 is a diagram for illustrating photographing ranges of a plurality of cameras according to the disclosure.

FIG. 3 is a diagram illustrating an example of a case wherein a plurality of cameras according to the disclosure are arranged in a vehicle, and FIG. 4 is a diagram for illustrating photographing ranges of a plurality of cameras according to the disclosure.

Referring to FIG. 3 and FIG. 4, the plurality of cameras 110 include four cameras. Such a plurality of cameras may be arranged in each corner of the roof of a vehicle.

For example, the first camera 110-1 may be arranged on the right side of the front surface area of the roof of a vehicle, and photograph the front surface and the right side of a vehicle with the front surface and the right side (i.e., the diagonal direction) as the photographing direction.

Meanwhile, the second camera 110-2 may be arranged on the left side of the front surface area of the roof of a vehicle. Such a second camera 110-2 may photograph the front surface and the left side directions of a vehicle with the front surface and the left side as the photographing direction.

As described above, the first camera 110-1 and the second camera 110-2 perform photographing with respect to the front surface direction of a vehicle while being overlapped with each other, and thus it is possible to estimate distance for an object located in the front surface direction of a vehicle.

Meanwhile, the third camera 110-3 may be arranged on the left side of the rear surface area of the roof of a vehicle, and photograph the left side and the rear surface area of a vehicle with the rear surface and the left side as the photographing direction.

As described above, the second camera 110-2 and the third camera 110-3 perform photographing with respect to the left side of a vehicle while being overlapped with each other, and thus it is possible to estimate distance for an object located in the left side of a vehicle.

Meanwhile, the fourth camera 110-4 may be arranged on the back side of the rear surface area of the roof of a vehicle, and photograph the rear surface and the right side of a vehicle with the rear surface and the right side directions as the center axis.

As described above, the third camera 110-3 and the fourth camera 110-4 perform photographing with respect to the rear surface direction of a vehicle while being overlapped with each other, and thus it is possible to estimate distance for an object located in the rear surface direction of a vehicle.

Also, the fourth camera 110-4 and the first camera 110-1 perform photographing with respect to the right side of a vehicle while being overlapped with each other, and thus it is possible to estimate distance for an object located in the right side of a vehicle.

In addition, the aforementioned first to fourth cameras have wide fields of view of greater than or equal to 200 degrees, and intervals among cameras greater than or equal 80 mm. Thus, two cameras that are distanced from each other may perform photographing with respect to each of the front surface/the left side surface/the right side surface/the rear surface of a vehicle. Meanwhile, in the illustrated embodiment, each camera has a field of view of 220 degrees, but the disclosure is not limited to the field of view.

As described above, in the disclosure, four cameras have fields of view of 220 degrees, and thus a vision system may have an overall field of view (FOV) of 360 degrees with respect to a horizontal direction, and may have a field of view of 180 degrees with respect to a vertical direction.

Meanwhile, in the illustrated embodiment, it was illustrated and explained that a plurality of cameras are arranged on the roof of a vehicle, but in actual implementation, a plurality of cameras may be arranged on the pillars of a vehicle (e.g., an A pillar, a C pillar). Alternatively, two of a plurality of cameras may be arranged on the bonnet or the side mirror. Also, while it was illustrated and explained above that a vehicle is a car, in actual implementation, a freight car or various industrial cars may be used, and in such cases, cameras may be arranged in areas appropriate for measuring all directions of a vehicle in each vehicle.

In addition, the disclosure may not only be applied to a moving body operating with wheels, but also to a moving body operating with a caterpillar or an unmanned aircraft such as a drone operating with a propeller.

Figure 5:
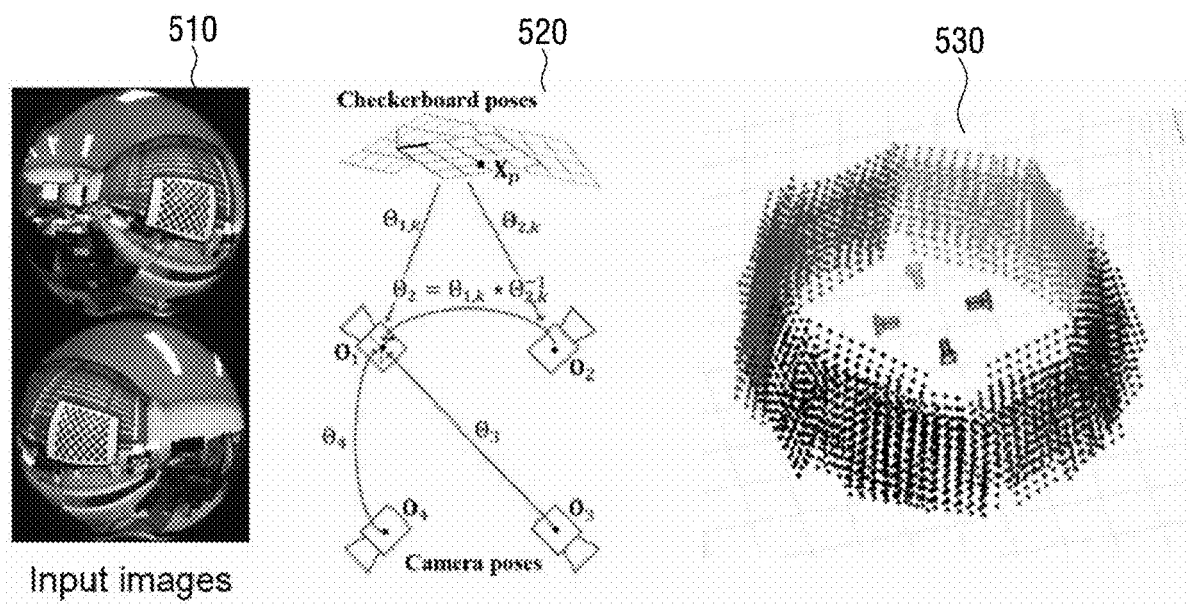
FIG. 5 is a diagram for illustrating a calibration method according to an embodiment of the disclosure.

Meanwhile, in illustrating FIG. 4 and FIG. 5, a vison apparatus was constituted by using four cameras, but in actual implementation, a vision apparatus may be constituted by using five cameras. Also, in the above, cameras generating images of a general visible light band were used, but in actual implementation, each camera can photograph not only a visible light area but also an infrared light area, and thus the aforementioned operation may be performed by using an infrared light image at night.

As described above, in a vision system according to the disclosure, intervals among cameras are very wide compared to the distance to an object. Also, there is a characteristic that cameras mounted have ultra-wide FOVs.

Accordingly, in order to measure distance by using images photographed at cameras mounted in an environment as described above, there is a need to precisely estimate the third-dimensional postures of cameras installed first.

Hereinafter, a posture estimation method according to the disclosure will be described with reference to FIG. 5.

FIG. 5 is a diagram for illustrating a calibration method according to an embodiment of the disclosure.

Lens distortion may be modeled as a polynomial. Also, if a projection function Π is mapped to a two-dimensional coordinate x on an image plan regularized on a three-dimensional coordinate X, it may be expressed as formula 1.

$$x=\Pi(X;\Phi) \quad \text{[Formula 1]}$$

Here, x is a two-dimensional coordinate, X is a three-dimensional coordinate, and Φ is a unique parameter of a fish-eye lens.

The regularized image coordinate x may be converted into a pixel coordinate by affine transformation A(x).

In camera calibration, a checker board may be used. For example, with respect to each camera, relative location with a lens initial parameter and a checker board may be calculated, and by using such relative location, an operation of initializing a rig and optimizing all external and internal parameters may be performed.

A big checker board may be used to ensure sufficient overlapping. Here, an external parameter may be expressed as $\theta=(r^T, t^T)^T$. Also, r means axial angle rotation, and t means a conversion vector $(r, t \in \mathbb{R}^3)$.

In addition, a stiff conversion matrix M(θ) may be given as [R(r) t]. Here, R(r) may mean a 3×3 rotation matrix corresponding to r.

From a checker board image of the $i^{th}$ camera, a lens internal parameter may be $\Phi_i$ and $A_i$, and relative location of the camera to the checker board may be expressed as $\{\theta_{i,k}\}$. Here, k means a capture index.

Relative location from the camera i to the camera j may be calculated as $\theta_{j,k} * \theta_{i,k}^{-1}$ from the pairs of images (i, k) and (j, k) photographed simultaneously. Here, * is a composition operation, and −1 is an inverse operation.

With respect to external correction, the poses of all cameras $\{\theta_i\}$ and the pose of the checker board $\{\theta_k\}$ may be initialized in a second camera coordinate system as illustrated in the middle part of FIG. 5. Meanwhile, in actual implementation, another camera other than the second camera may be initialized first.

Also, as in formula 2, calibration may be performed to minimize a re-projection error between images with respect to a corner coordinate of a checker board image.

$$\min_{\substack{\Phi_i, A_i \\ \Theta_i, \Theta_k}} \sum_{(i,k)} \sum_p \left\| \tilde{x}_{i,p} - A_i \left( \prod \left( M(\Theta_i \star \Theta_k) \begin{bmatrix} X_p \\ 1 \end{bmatrix}; \Phi_i \right) \right) \right\|^2 \quad \text{[Formula 2]}$$

Here, {(i, k)} is a set of measured values of the location of the checker board k at the $i^{th}$ camera. Also, $X_p$ is the coordinate of a corner location inside the checker board p. Meanwhile, $\tilde{x}_{i,p}$ is the pixel coordinate of $X_p$ in the $i^{th}$ image. For such optimization, a Ceres solver may be used.

Referring to the above feature, first, photographing may be performed by arranging a checker board having check patterns (or grid patterns) between two cameras 510. Here, the checker board may have a predetermined size, and may have a plurality of check patterns.

In case two cameras photograph one checker board simultaneously as above, the processor 120 may detect an area wherein the checker board is located in the output image of each camera, and estimate the postures of the two cameras or perform calibration for the two cameras based on the detected checker board areas 520. For example, the processor 120 may calibrate the first camera 110-1 based on the second camera 110-2, and sequentially calibrate the third camera 110-3 based on the second camera 110-2, and calibrate the fourth camera 110-4 lastly.

Meanwhile, in actual implementation, checker boards may be arranged in at least three of the four orientations (the front surface, the left side, the right side, the rear side) and calibration for four cameras may be performed simultaneously. Here, the processor 120 may perform calibration such that a re-projection error between images with respect to a corner coordinate of a checker board image can be minimized, as described above.

Then, when calibration is completed, posture information for each of the plurality of cameras may be calculated 530. For example, in case a checker board is located in a predetermined location based on a vehicle (e.g., in the direction of 3 m from the front surface of a vehicle, and in 1 m height from the bottom), the posture of each camera can be estimated more precisely in the aforementioned process.

Figure 6:
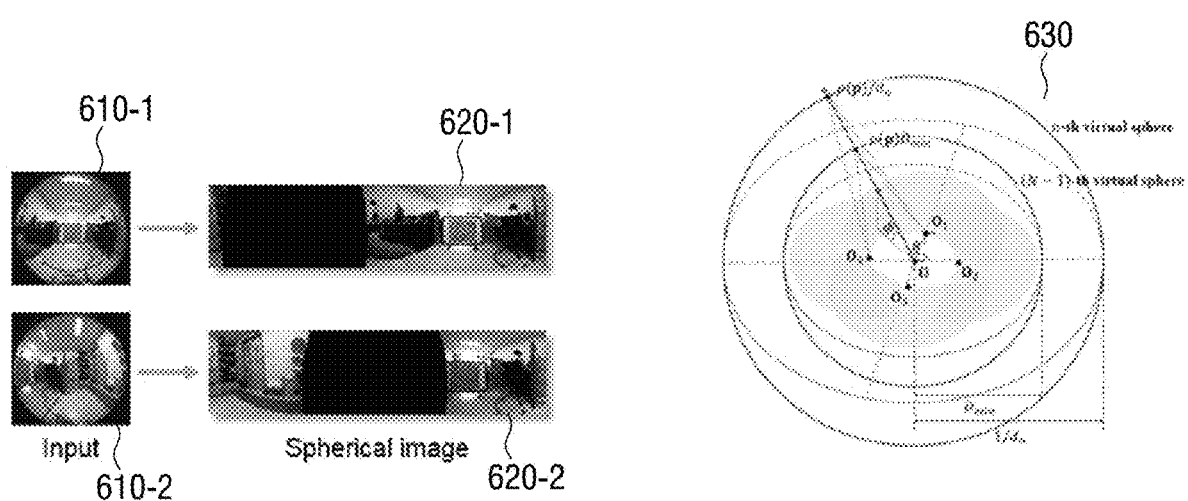
FIG. 6 is a diagram for illustrating a stereo mapping method according to an embodiment of the disclosure.

FIG. 6 is a diagram for illustrating a stereo mapping method according to an embodiment of the disclosure.

Meanwhile, various stereo mapping methods may be used for estimating distance for all directions near a vehicle. For example, a plane-sweep algorithm, a local sphere-sweep algorithm, and a global (spherical)-sweep algorithm may be used.

As described above, in the vision system according to the disclosure, a plurality of cameras distanced from one another are used, and thus a global (spherical)-sweep algorithm is most appropriate. For this reason, hereinafter, a global (spherical)-sweep algorithm will be explained.

Meanwhile, in actual implementation, not only a global (spherical)-sweep algorithm, but also the aforementioned plane-sweep algorithm and local sphere-sweep algorithm may be used, and also, the aforementioned algorithms may be used while being modified.

Referring to FIG. 6, based on the camera posture estimated in the preceding process, a virtual spherical surface 630 of which starting point is set as the center of the rig on which the camera is installed, and of which radius is distance sampled in a specific unit may be set. Specifically, the center of sweep can be anywhere, but for minimizing distortion of a spherical image, a rig for a starting point may be selected as the center, and an xy plane may be aligned to be close to the center of the camera.

In a spherical coordinate system as above, p=(θ, φ) may correspond to $p(p)=(\cos(\phi)\cos(\theta), \sin(\phi), \cos(\phi)\sin(\theta))^T$. Also, if an external parameter of a camera is converted into $\{\theta^*_i\}$ in a rig coordinate system, the projection function may be expressed as $A_i(\Pi(X; \Phi_i))$.

Accordingly, images 610-1, 610-2 photographed at each camera 110 may be projected on the aforementioned virtual spherical surfaces 620-1, 620-2, and the projected images may be stereo-matched, and distance for all directions may thereby be estimated.

Specifically, each pixel inside a distorted spherical image S may be expressed as (θ,φ). Such a spherical image S may have a W×H resolution, and may have a θ change amount of from −π to π. Meanwhile, φ has a range of from −π/2 to π/2, but the ceiling or the bottom is not an area of interest, and thus a small range may be used. An N sphere may be sampled such that the inverse depth is uniform, and for example, when the minimal depth is $D_{min}$, the inverse depth to the $n^{th}$ sphere may be $d_n=n/(D_{min}(N-1))$, $n \in [0, \ldots, N-1]$. That is, the radius of a sphere may be $1/d_n$ (n is not 0).

Referring to 630 of FIG. 6, the pixel value of a spherical image may be expressed as formula 3 as below.

Figure 7:
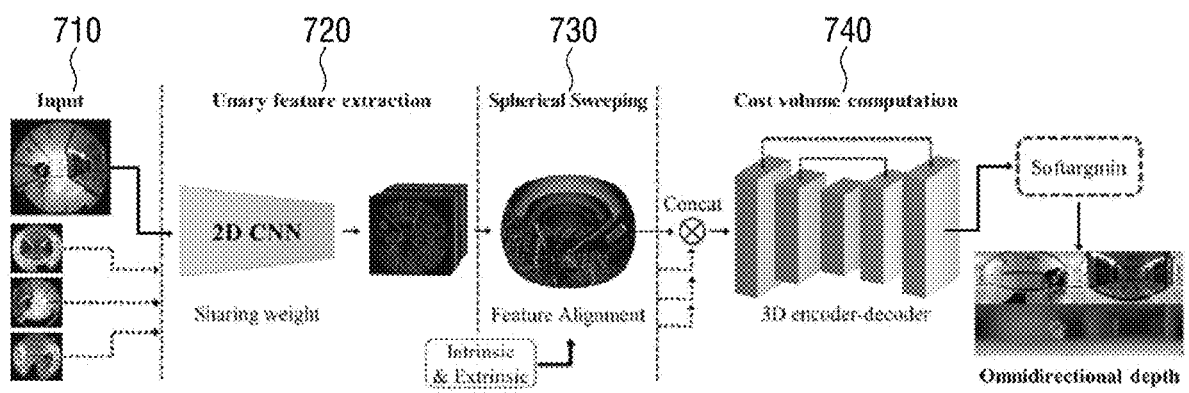
FIG. 7 is a diagram for illustrating a distance estimation method using an artificial intelligence neural network according to an embodiment of the disclosure.

Referring to FIG. 7, a distance estimation method according to an embodiment of the disclosure consists of 1) unary feature extraction, 2) spherical sweeping, and 3) cost volume computation. Meanwhile, a network architecture for the operation in FIG. 7 is as in Table 1 as below.

TABLE 1

| Name | | Layer Property | Output (H, W, N, C) |
|---|---|---|---|
| Unary feature extraction | Input | | $H_1 \times W_1$ |
| | conv1 | 5 × 5, 32 | |
| | conv2 | 3 × 3, 32 | |
| | conv3 | 3 × 3, 32, add conv1 | $\frac{1}{2}H_1 \times \frac{1}{2}W_1 \times 32$ |
| | conv4-11 | repeat conv2-3 | |
| | conv12-17 | repeat conv2-3 with dilate = 2, 3, 4 | |
| Spherical sweeping | warp | | $H \times W \times \frac{1}{2}N \times 32$ |
| | transference | 3 × 3 × 1, 32 | $\frac{1}{2} \times \frac{1}{2} \times \frac{1}{2} \times 32$ |
| | concat(4)* | | $\frac{1}{2} \times \frac{1}{2} \times \frac{1}{2} \times 128$ |
| | fusion | 3 × 3 × 3, 64 | $\frac{1}{2} \times \frac{1}{2} \times \frac{1}{2} \times 64$ |
| Cost volume computation | 3Dconv1-3 | 3 × 3 × 3, 64 | $\frac{1}{2} \times \frac{1}{2} \times \frac{1}{2} \times 64$ |
| | 3Dconv4-6 | 3 × 3 × 3, 128 | $\frac{1}{4} \times \frac{1}{4} \times \frac{1}{4} \times 128$ |
| | 3Dconv7-9 | 3 × 3 × 3, 128 | $\frac{1}{8} \times \frac{1}{8} \times \frac{1}{8} \times 128$ |
| | 3Dconv10-12 | 3 × 3 × 3, 128 | $\frac{1}{16} \times \frac{1}{16} \times \frac{1}{16} \times 128$ |
| | 3Dconv13-15 | 3 × 3 × 3, 256 | $\frac{1}{32} \times \frac{1}{32} \times \frac{1}{32} \times 256$ |
| | 3Ddeconv1 | 3 × 3 × 3, 128, add 3Dconv12 | $\frac{1}{16} \times \frac{1}{16} \times \frac{1}{16} \times 128$ |
| | 3Ddeconv2 | 3 × 3 × 3, 128, add 3Dconv9 | $\frac{1}{8} \times \frac{1}{8} \times \frac{1}{8} \times 128$ |
| | 3Ddeconv3 | 3 × 3 × 3, 128, add 3Dconv6 | $\frac{1}{4} \times \frac{1}{4} \times \frac{1}{4} \times 128$ |
| | 3Ddeconv4 | 3 × 3 × 3, 64, add 3Dconv3 | $\frac{1}{2} \times \frac{1}{2} \times \frac{1}{2} \times 64$ |
| | 3Ddeconv5 | 3 × 3 × 3, 1 | $H \times W \times N$ |
| | softargmin | | $H \times W$ |

$$S_{i,n}(p) = I_i\left(\prod_i \left(M(\Theta_i^*)\begin{bmatrix}\rho(p)/d_n \\ 1\end{bmatrix}\right)\right) \quad \text{[Formula 3]}$$

Here, Ii is an image captured at the $i^{th}$ camera. When n is 0, $d_0=2^{-23}$ may be used. Meanwhile, if a projected pixel does not exist in a visible area of an input image, additional processing may not be performed.

Meanwhile, in FIG. 6, a spherical surface is used, but for a three-dimensional figure projected, various forms such as a cube, a cuboid, a cylinder, etc. may be used according to the surrounding environment, as long as it can cover all directions.

Meanwhile, for stereo matching, two images photographed at locations distanced from each other are used. In the case of using images photographed at cameras having general fields of view, stereo matching may be performed by simply moving (ID-shift) images to the left or right.

If a method as above is used for estimating distance for all directions of a vehicle, at least 12 cameras (in case the field of view of a camera is 60 degrees, 2*6 cameras) are needed. Also, when estimating distance from each pair, propagation of information for adjacent areas among pairs is difficult, and a problem of discontinuity occurs on a border surface.

Accordingly, in the disclosure, while a lens having a wide angle is used, the lens is arranged in a diagonal direction in a corner area of a moving body, and thus distance for all directions of a vehicle is estimated with a small number of cameras.

FIG. 7 is a diagram for illustrating a distance estimation method using an artificial intelligence neural network according to an embodiment of the disclosure.

First, in the step of unary feature extraction 720, a feature map may be extracted from an input image 710 acquired at each camera. For example, each of four input images 710 acquired at each of the four cameras may be input into a 2D convolution neural network (CNN) and a feature map may be extracted.

By using a feature map, operations such as projection, matching, etc. may be performed with a smaller amount of operations than using images generated at cameras as they are. Meanwhile, in case the amount of recourses of a system is quite high, a process of generating a feature map may be omitted.

In the step of spherical sweeping 730, four feature maps are projected on a spherical surface through a global (spherical)-sweep process of 2-c-iii 730. Specifically, feature maps may be projected on a spherical surface by using a method as described in FIG. 6. Meanwhile, in FIG. 7, features maps are projected, and thus formula 3 may be expressed as formula 4.

$$S_i(\phi, \theta, n, c) = U_c\left(\frac{1}{r}\prod_i (\overline{p}(\theta, \phi)/d_n)\right) \quad \text{[Formula 4]}$$

Also, in the step of cost volume computation 740, the feature maps may be converted to include physical space information for three-dimensional areas in all directions, and the merging result may be reflected to a 3D encoder-decoder, and a depth map may be generated.

Specifically, spherical feature maps may be incorporated into a 4D initial cost volume through 3×3×3 synthesis. Also, the cost may be subdivided and regularized by using a 3D encoder-decoder architecture.

Lastly, an inverse depth index $\hat{n}$ may be calculated by formula 5 as below.

$$\hat{n}(\theta, \phi) = \sum_{n=0}^{N-1} n \times \frac{e^{-C(\phi,\theta,n)}}{\sum_v e^{-C(\phi,\theta,v)}} \qquad \text{[Formula 5]}$$

Here, C is a regularized cost volume with respect to (H×W×N).

For training a network by an end-to-end method, an input image and a ground truth inverse depth index as in formula 6 may be used $$n^*(\theta, \phi) = \text{round}\left((N-1)\frac{d^*(\theta, \phi) - d_0}{d_{N-1} - d_0}\right) \qquad \text{[Formula 6]}$$

Here, $d^*(\bullet) = 1/D^*(\bullet)$ means a ground truth inverse depth, and c means a minimal inverse depth, and $d_{N-1}$ means a maximum inverse depth. Also, an absolute error loss between the ground truth and a predicted index may be defined as follows.

$$L(\theta, \phi) = \frac{1}{\sum_i M_i(\theta, \phi)} |\hat{n}(\theta, \phi) - n^*(\theta, \phi)| \qquad \text{[Formula 7]}$$

Figure 8:
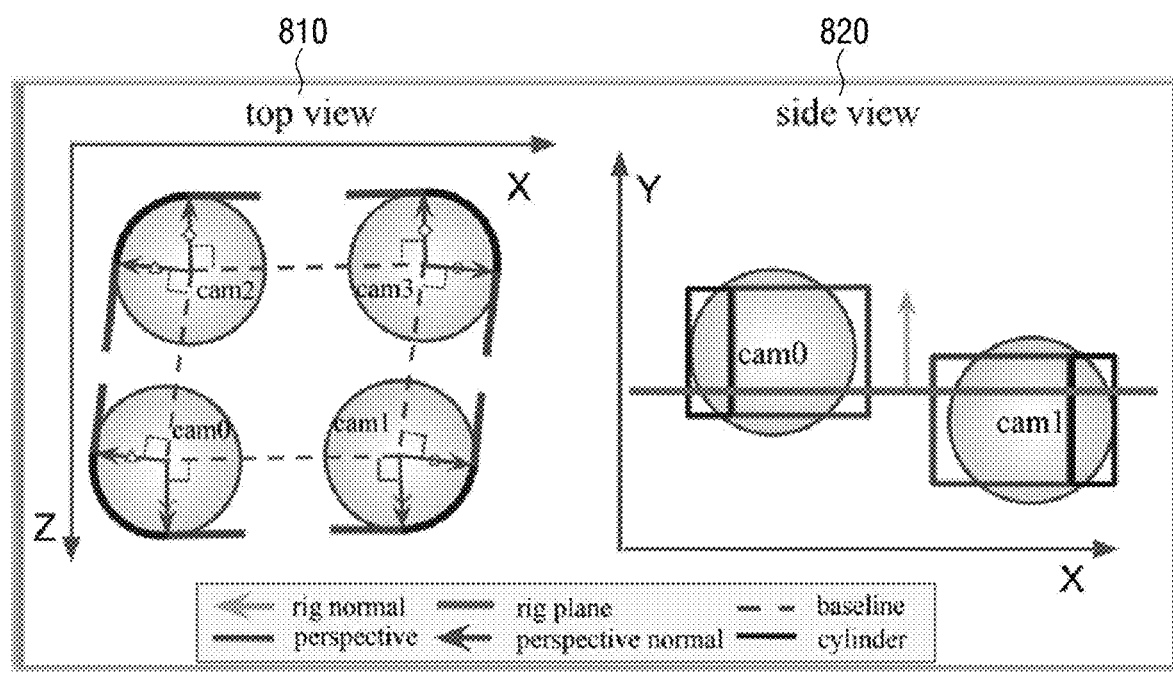
FIG. 8 is a diagram for illustrating a fish-eye image projection model according to an embodiment of the disclosure.
Figure 9:
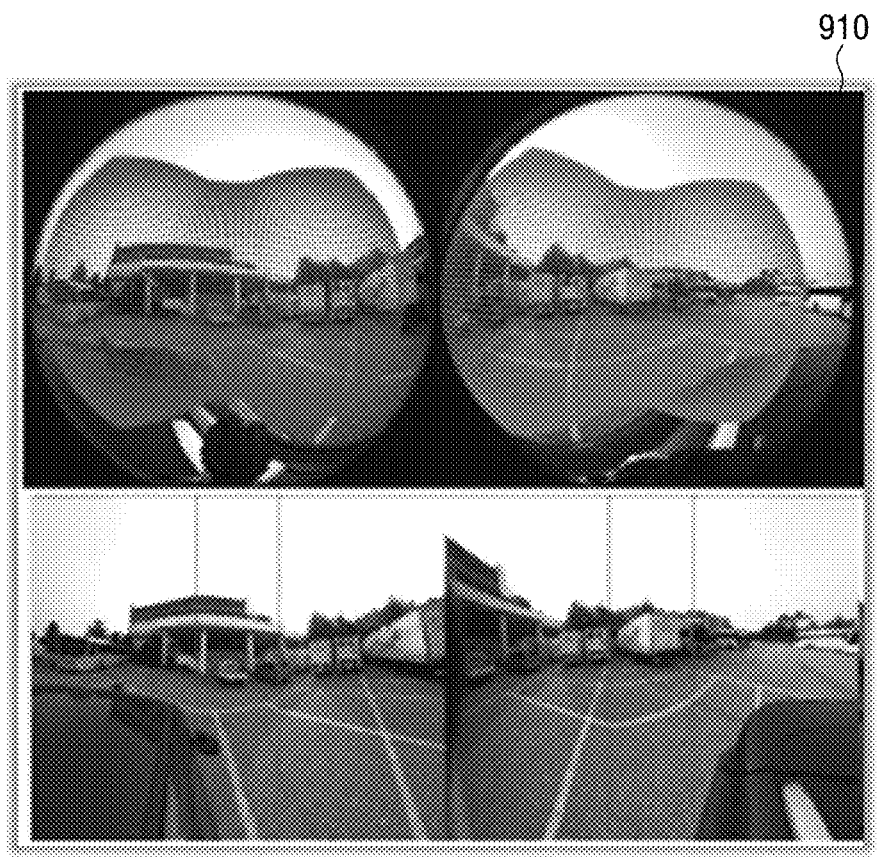
FIG. 9 is a diagram illustrating an example of a stereo image in case a fish-eye image projection model according to an embodiment of the disclosure is used.

FIG. 8 is a diagram for illustrating a fish-eye image projection model according to an embodiment of the disclosure, and FIG. 9 is a diagram illustrating an example of a stereo image in case a fish-eye image projection model according to an embodiment of the disclosure is used.

Conventional fish-eye images are projected differently due to distortion even if they are the same objects, and thus they cause noticeable degradation of performance of a conventional computer vision algorithm looking for corresponding pairs through similarity of images. Such a limitation exerts influence on the technological performance of the disclosure estimating movements based on corresponding pairs.

Accordingly, in the disclosure, an image projection model that effectively corrects distortion of fish-eye images different from one another through posture information among cameras different from one another is used, and performance resistance of a conventional corresponding pair estimation algorithm based on similarity of images can thereby be prevented.

For example, one plane (rig-plane) 810 that explains the three-dimensional locations of all cameras best may be determined through a least square method.

Afterwards, a planar polynomial 820 which is in parallel to a line connecting adjacent cameras different from each other (inter-view) and is perpendicular to a rig-plane is acquired, and distortion may be corrected by projecting a portion wherein fields of view among cameras overlap to the plane model, and distortion may be improved by projecting a portion wherein fields of view do not overlap to a cylinder model. For example, by improving distortion of two images in the lower part as illustrated in FIG. 9 by the aforementioned method, a corrected image as in the upper part of FIG. 9 may be generated.

Also, a hybrid projection model which smoothly connects the plane model and the cylinder model may be used.

A conventional posture estimation method may be operated in the case of knowing corresponding pairs of a two-dimensional dot and an actual three-dimensional dot in a monocular camera image. However, as the disclosure is applied to a multi camera system, a posture estimation algorithm applied to the vision system of the disclosure will be described below with reference to FIG. 10.

FIG. 10 is a diagram for illustrating a posture estimation algorithm according to an embodiment of the disclosure.

Referring to FIG. 10, in the case of knowing three corresponding pairs of a two-dimensional image dot and an actual three-dimensional dot in a multi camera system, a posture may be estimated in consideration of their probabilistic distribution.

Hereinafter, it will be assumed that a camera posture acquired when three corresponding pairs extracted from a camera wherein there are many observation points are used will be more precise than a value wherein the amount of observation values is small.

In this case, in a process of optionally selecting each camera, and selecting corresponding pairs measured at a camera, cameras wherein there are many observation values may be selected more in terms of probability.

A posture acquired as above may be applied to observation corresponding pairs of all cameras and geometric conformability may be identified, and in case the number of corresponding pairs having an error smaller than or equal to a threshold is the highest, the posture in this case may be set as the optimal posture.

Then, after repetition is completed, the posture set as the optimal posture may be used as a posture estimation result.

Meanwhile, the vision system according to the disclosure is operated while being installed on a mobile body such as a vehicle. Accordingly, the posture of a camera may be changed due to physical factors such as the trembling of the vehicle. However, as described above, posture information of a camera is used, and accordingly, in case a changed posture is not reflected, an error cannot help being reflected to the final result.

Thus, for reflecting an error according to change of a camera posture as above, in the disclosure, a relative posture among cameras, i.e., an external parameter is optimized at the same time in addition to the postures of cameras and an environment map, and stability of the whole system is thereby secured.

For example, a camera posture and a three-dimensional dot, and an external parameter of a camera are optimized in the direction of minimizing geometric errors by using all observation values, and then observation values which are greater than or equal to three times of a standard threshold may be selected among the observation values.

Afterwards, the aforementioned optimization method proceeds again by using the selected observation values, and then observation values which are smaller than or equal to 1.5 times of a standard threshold may be selected among the observation values.

Then, the aforementioned optimization process proceeds again by using the selected observation values, and observation values smaller than or equal to a standard threshold may be selected and the optimized camera posture, the three-dimensional dot, and the external parameter may be used as final products, and may be re-used for the whole system.

In case the vision system is applied to an actual vehicle, an error may occur in a physical relation among multi cameras that is generated due to a drastic movement of the vehicle, the trembling of the vehicle according to the state of the road, etc.

However, in the disclosure, a camera posture may be identified in real time and corrected, as described above, and thus degradation of performance according to proceeding of driving can be prevented.

FIG. 11 is a flow chart for illustrating a method of generating distance information according to an embodiment of the disclosure.

Referring to FIG. 11, an image is received from each of a plurality of cameras that are arranged to be distanced from one another, and are arranged in a diagonal direction to the moving direction of the moving body at operation S1110.

Then, the plurality of received images are stereo-matched and distance information for all directions of the moving body is generated at operation S1120. For example, each of the plurality of received images may be reflected on a virtual three-dimensional figure, and stereo matching may be performed by using the projected images. With respect to the detailed stereo matching method, explanation was made above, and thus overlapping explanation will be omitted.

The distance to the surroundings of the moving body may be estimated by using distance information generated as above at operation 51130. For example, approach of an object may be detected, or whether there is a dangerous matter may be identified by using the estimated distance.

As described above, in the method of generating distance information according to the disclosure, it is possible to generate distance information for all directions of a moving body by using only four cameras. Meanwhile, the method of generating distance information according to the disclosure may be implemented in the form of a program code for performing each step, and may be stored in a recording medium and distributed. In this case, an apparatus on which a recording medium is mounted may perform the aforementioned operations such as encryption, encryption processing, etc.

Such a recording medium may be computer-readable media in various types such as a ROM, a RAM, a memory chip, a memory card, an external hard, a hard, a CD, a DVD, a magnetic disk, or a magnetic tape.

So far, the disclosure has been described with reference to the accompanying drawings, but the scope of the disclosure is intended to be determined by the appended claims, and is not intended to be interpreted as being limited to the aforementioned embodiments and/or drawings. Also, it should be clearly understood that alterations, modifications, and amendments of the disclosure described in the claims that are obvious to a person skilled in the art are also included in the scope of the disclosure.

What is claimed is:

1. An image processing device for acquiring a distance from a moving body to at least one object located in any direction of the moving body, comprising:
at least one memory that stores instructions; and
at least one processor configured to execute the instructions to perform or support another device to perform: on condition that a plurality of cameras, having ultra-wide field of views (FOVs) and capable of covering all directions of the moving body by using each of their respective FOVs, have been arranged to be apart from one another on the moving body, in response to acquiring a plurality of images generated by the cameras, (I) a process of inputting the images to a spherical sweep network and allowing the spherical sweep network to (i) project a plurality of pixels included in the images onto a virtual spherical coordinate system to thereby generate a plurality of spherical images, wherein the virtual spherical coordinate system is configured to include virtual n spheres, each of whose radii corresponds to each of sampling distances from a reference point and wherein the pixels included in the images are sampled for each of the sampling distances and (ii) apply a three-dimensional (3D) concatenating operation to the spherical images to thereby generate a four-dimensional (4D) initial cost volume, (II) a process of inputting the 4D initial cost volume to a cost volume computation network, including a plurality of 3D convolution layers and their corresponding 3D deconvolution layers, to thereby generate a 3D final cost volume, and (III) a process of (i) generating inverse depth indices respectively corresponding to inverse depths of the virtual n spheres by using the 3D final cost volume, wherein each of the inverse depths represent each of inverse values of each of the radii of the virtual n spheres, and (ii) extracting the radii by referring to the inverse depths derived from the inverse depth indices, to thereby acquire the distance from the moving body to the at least one object located in any direction of the moving body.

2. The device of claim 1, wherein the processor further performs a process of:
(IV) generating at least one absolute error loss by referring to the inverse depth indices and their corresponding ground truths and thus training at least part of the spherical sweep network and the cost volume computation network by using the absolute error loss through an end-to-end way.

3. The device of claim 1, wherein each of coordinates of each of pixels located on the spherical images is represented by using each of azimuth angles and each of polar angles on the virtual spherical coordinate system, and
wherein, at the process of (III), the processor normalizes the 3D final cost volume by referring to each of the azimuth angles and each of the polar angles of the virtual spherical coordinate system, to thereby generate the inverse depth indices.

4. The device of claim 1, wherein, before the process of (I), the processor performs a calibration process which applies an optimization operation to one or more external parameters and one or more internal parameters of the cameras,
wherein the optimization operation is carried out by (i-1) locating a checker board, having grid patterns thereon, in between two adjacent cameras among the cameras arranged to be apart from one another on the moving body, and detecting each coordinate of each corner of the checker board by using reference images obtained from the adjacent cameras, (i-2) performing the calibration process capable of optimizing one or more specific external parameters and one or more specific internal parameters of the adjacent cameras by referring to the each coordinate of each corner of the checker board such that a re-projection error between the reference images is minimized, and (ii) while selecting other two adjacent cameras among the cameras, repeatedly performing the calibration process for said other adjacent cameras, to thereby optimize the external parameters and the internal parameters of all the cameras.

5. The device of claim 1, wherein the cameras are arranged to be apart from one another on a rig mounted on the moving body, and wherein, before the process of (I), the processor minimizes (i) a first geometric error associated with camera posture information of the cameras corresponding to rig posture information of the rig, (ii) a second geometric error associated with 3D points corresponding to a surrounding environment map on a location of the moving body, and (iii) a third geometric error associated with external parameters including relative posture information among the cameras, to thereby perform an optimization process that tracks changes in the camera posture information caused by movements of the moving body.

6. The device of claim 5, wherein, in response to receiving the images from the cameras, the processor processes the images obtained from the cameras by repeatedly performing an image processing process, to thereby perform the optimization process with the processed images, wherein the image processing process includes sub-processes of (i) determining a rig-plane including all the cameras thereon by using a least square calculation, (ii) acquiring information on a specific plane that is perpendicular to the rig-plane and is in parallel to a line connecting two adjacent cameras among the plurality of cameras, (iii) projecting a first image part, captured at a region where the FOVs of the adjacent cameras overlap, onto a planar model parallel to the specific plane and projecting a second image part, captured at a region where the FOVs of the adjacent cameras do not overlap, onto a cylindrical model perpendicular to the specific plane, and (iv) obtaining a hybrid projection model by referring to the planar model and the cylindrical model.

7. The device of claim 6, wherein, after performing the image processing process, the processor (i) selects a specific camera from the plurality of cameras and samples multiple sets of image points, wherein each set of image points includes three specific corresponding pairs each of which is comprised of (1) a two-dimensional (2D) image point on a specific image captured by the specific camera and (2) its corresponding actual three-dimensional (3D) point, (ii) repeatedly samples other multiple sets of other image points which include three other corresponding pairs for all other cameras except the specific camera among the cameras, to thereby acquire all pieces of the rig posture information of the rig, and confirms a geometric conformability of the rig posture information by applying all pieces of the rig posture information to all three corresponding pairs, including the three specific corresponding pairs and said three other corresponding pairs, and (iii) determines a certain set of image points which possesses most number of its corresponding pairs with errors smaller than or equal to a preset threshold and selects certain rig posture information corresponding to the certain set of image points as optimized rig posture information for the rig to thereby minimize the first geometric error.

8. The device of claim 1, wherein, at the process of (I), in response to receiving the images from the cameras, the processor generates a plurality of feature maps corresponding to the images by inputting the images to a plurality of 2D convolution layers, and thus generates the spherical images from the feature maps.

9. The device of claim 1, wherein the cameras are arranged to be apart from one another on a rig mounted on the moving body, and wherein the processor sets a center of the rig as the reference point.

10. A method for acquiring a distance from a moving body to at least one object located in any direction of the moving body, comprising:

acquiring at an image processing device a plurality of images generated by a plurality of cameras spaced apart from one another on the moving body, each of the plurality of cameras having ultra-wide field of views and capable of covering all directions of the moving body by using each of their respective FOVs;

(a) inputting, by the image processing device, the images to a spherical sweep network, the spherical sweep network
  (i) projecting a plurality of pixels included in the images onto a virtual spherical coordinate system to generate a plurality of spherical images, wherein the virtual spherical coordinate system is configured to include virtual n spheres, each of whose radii corresponds to each of sampling distances from a reference point, wherein the pixels included in the images having been sampled for each of the sampling distances, and
  (ii) applying a three-dimensional (3D) concatenating operation to the spherical images to generate a four-dimensional (4D) initial cost volume;

(b) inputting, by the image processing device, the 4D initial cost volume to a cost volume computation network, including a plurality of 3D convolution layers and corresponding 3D deconvolution layers, and generating a 3D final cost volume; and (c) the image processing device
  (i) generating inverse depth indices respectively corresponding to inverse depths of the virtual n spheres by using the 3D final cost volume, wherein each of the inverse depths represent each of inverse values of each of the radii of the virtual n spheres, and
  (ii) extracting the radii by referring to the inverse depths derived from the inverse depth indices, to thereby acquire the distance from the moving body to the at least one object located in any direction of the moving body.

11. The method of claim 10, further comprising:

(d) generating, by the image processing device, at least one absolute error loss by referring to the inverse depth indices and their corresponding ground truths and thus training at least part of the spherical sweep network and the cost volume computation network by using the absolute error loss end-to-end.

12. The method of claim 10, wherein each of coordinates of each of pixels located on the spherical images is represented by using each of azimuth angles and each of polar angles on the virtual spherical coordinate system, and at (c), the image processing device generating the inverse depth indices by normalizing the 3D final cost volume by referring to each of the azimuth angles and each of the polar angles of the virtual spherical coordinate system.

13. The method of claim 10, further comprising before performing (a), performing a calibration process by the image processing device applying an optimization operation to one or more external parameters and one or more internal parameters of the cameras, wherein the optimization operation is carried out by (i-1) locating a checker board, having grid patterns thereon, in between two adjacent cameras among the cameras arranged to be apart from one another on the moving body, and detecting each coordinate of each corner of the checker board by using reference images obtained from the adjacent cameras, A(i-2) performing the calibration process capable of optimizing one or more specific external parameters and one or more specific internal parameters of the adjacent cameras by referring to the each coordinate of each corner of the checker board such that a re-projection error between the reference images is minimized, and (ii) while selecting other two adjacent cameras among the cameras, repeatedly, performing the calibration process for said other adjacent cameras, to thereby optimize the external parameters and the internal parameters of all the cameras.

14. The method of claim 10, wherein the plurality of cameras are arranged to be apart from one another on a rig mounted on the moving body, and the method further comprising:

before performing (a), the image processing device minimizing (i) a first geometric error associated with camera posture information of the cameras corresponding to rig posture information of the rig, (ii) a second geometric error associated with 3D points corresponding to a surrounding environment map on a location of the moving body, and (iii) a third geometric error associated with external parameters including relative posture information among the cameras, to thereby perform an optimization process that tracks changes in the camera posture information caused by movements of the moving body.

15. The method of claim 14, wherein, in response to receiving the plurality of images from the cameras, repeatedly performing an image processing process on the plurality of images obtained from the cameras, to thereby perform the optimization process with the processed images, wherein the image processing process includes sub-processes of (i) determining a rig-plane including all the cameras thereon by using a least square calculation, (ii) acquiring information on a specific plane that is perpendicular to the rig-plane and is in parallel to a line connecting two adjacent cameras among the plurality of cameras, (iii) projecting a first image part, captured at a region where the FOVs of the adjacent cameras overlap, onto a planar model parallel to the specific plane and projecting a second image part, captured at a region where the FOVs of the adjacent cameras do not overlap, onto a cylindrical model perpendicular to the specific plane, and (iv) obtaining a hybrid projection model by referring to the planar model and the cylindrical model.

16. The method of claim 15, wherein, after performing the image processing process, the image processing device (i) selecting a specific camera from the plurality of cameras and samples multiple sets of image points, wherein each set of image points includes three specific corresponding pairs each of which is comprised of (1) a two-dimensional (2D) image point on a specific image captured by the specific camera and (2) its corresponding actual three-dimensional (3D) point, (ii) repeatedly sampling other multiple sets of other image points which include three other corresponding pairs for all other cameras of the plurality of cameras except the specific camera among the plurality of cameras, to thereby acquire all pieces of the rig posture information of the rig, and confirming a geometric conformability of the rig posture information by applying all pieces of the rig posture information to all three corresponding pairs, including the three specific corresponding pairs and said three other corresponding pairs, and (iii) determining a certain set of image points which possesses most number of its corresponding pairs with errors smaller than or equal to a preset threshold and selects certain rig posture information corresponding to the certain set of image points as optimized rig posture information for the rig to thereby minimize the first geometric error.

17. The method of claim 10, wherein, at (a), in response to receiving the images from the plurality of cameras, the image processing device generating a plurality of feature maps corresponding to the images by inputting the images to a plurality of 2D convolution layers, and thus generating the spherical images from the feature maps.

18. The method of claim 10, wherein the plurality of cameras are arranged to be apart from one another on a rig mounted on the moving body, and the image processing device setting a center of the rig as the reference point.

* * * * *